Dec. 19, 1950  A. M. MacCALLUM  2,534,463
GYROSCOPE POSITION INDICATING DEVICE
Filed Sept. 16, 1946
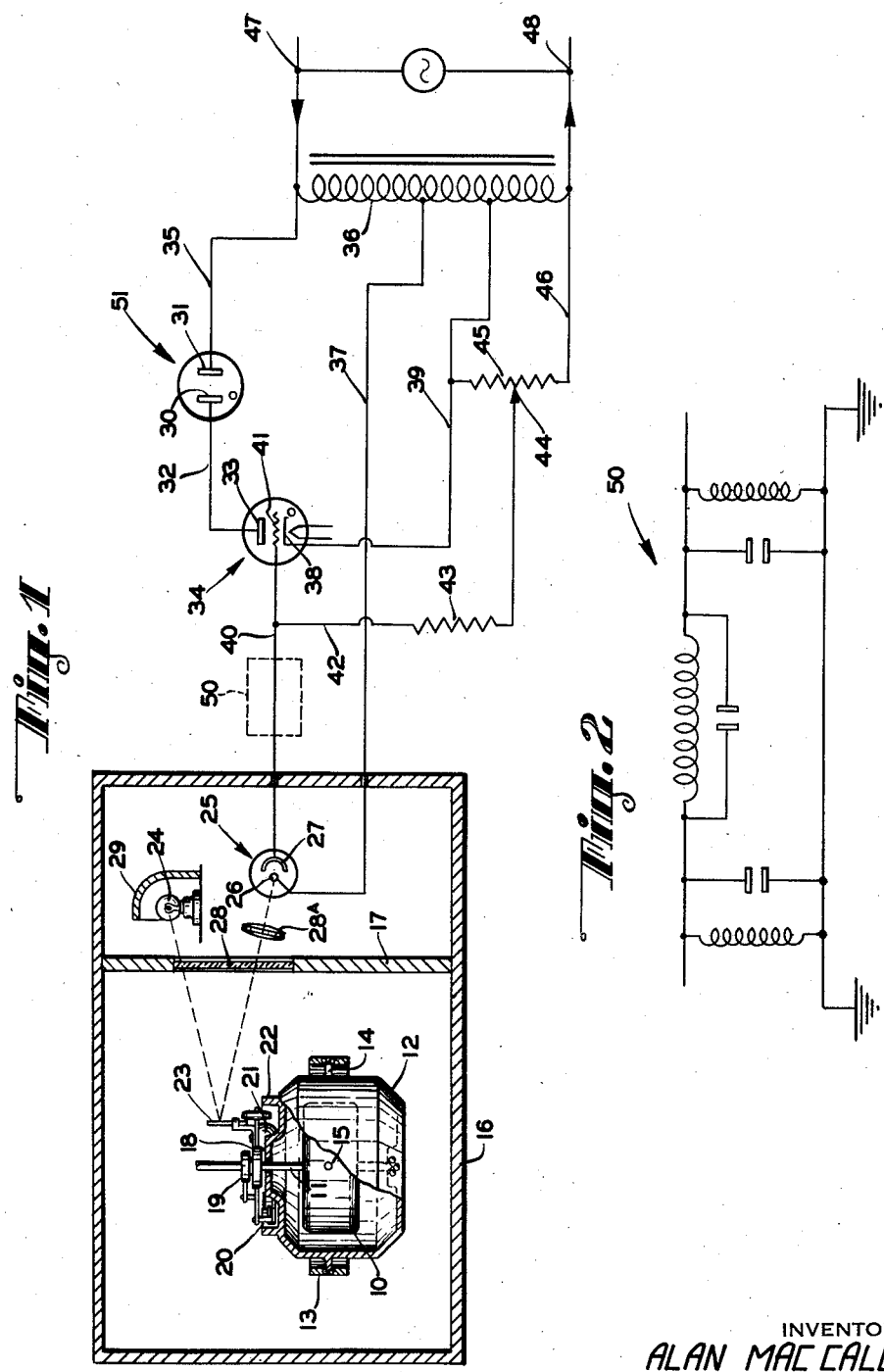
INVENTOR
ALAN MACCALLUM
BY
ATTORNEY Patented Dec. 19, 1950

2,534,463

UNITED STATES PATENT OFFICE 2,534,463

GYROSCOPE POSITION INDICATING DEVICE

Alan M. MacCallum, Maywood, N. J., assignor to Bendix Aviation Corporation, Teterboro, N. J., a corporation of Delaware Application September 16, 1946, Serial No. 697,203

5 Claims. (Cl. 177—311)

The present invention relates to indicating devices generally and more particularly to a "flasher" or "blinker" type of indicator whereby operation thereof imparts to an operator valuable information of a condition existing at a point removed some distance from the operator.

With the present simplification of automatic steering systems for mobile craft such as aircraft, for example, the artificial horizon or gyro vertical together with its pitch and bank signal take-offs has been moved from the instrument panel or automatic pilot panel and has been arranged, together with other controls, within a closed compact casing containing the thermionic amplifier of the system. The difficulty with this arrangement, however, is that inasmuch as the entire casing is closed and removed from the human pilot, it is impossible to know, with power applied to the system, when the gyro has come up to speed and also whether or not its spin axis is in the required substantially vertical position. This knowledge is important because the automatic steering system cannot safely take over control of the rudder, aileron and elevator craft surfaces until the horizon gyro is up to speed with its spin axis in a substantially vertical position.

The present invention has for one of its objects, therefore, the provision of a novel indicating mechanism whereby the human pilot will be visually informed as to the condition of the artificial horizon gyro, located at a remote point, so that he will refrain from engaging the automatic steering system until certain desired conditions are indicated by the mechanism to exist at the gyro.

Another object of the present invention is to provide a novel "flasher" or "blinker" type of indicating mechanism.

A further object is to provide a novel electrical remote indicator adapted for use wherever it is desired to indicate at one point the existence of certain desired conditions at another and remote point.

Another object is to provide a novel arrangement for indicating the position of a gyroscope located at a remote point without any mechanical connection between the gyro and the indicator.

A further object of the present invention is to provide a novel "flasher" or "blinker" type of mechanism incorporated in an electric circuit having a firing tube which is normally biased to cut-off but which is fired upon the occurrence of a desired condition.

The above and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description only and is not designed as a definition of the limits of the invention.

In the drawings, Figure 1 represents a wiring diagram of the novel indicating mechanism of the present invention in its application to an artificial horizon gyro or gyro vertical and Figure 2 is a wiring diagram of a conventional band pass filter for use with the circuit of Figure 1 under certain conditions.

The novel indicating mechanism of the present invention is shown in Figure 1 of the drawing as applied to a conventional artificial horizon gyroscope having either an electrically or pneumatically driven rotor 10 provided with normally vertical spin axis defined by a trunnion 11 which journals the rotor within a suitable casing 12. The latter casing, in turn, is journalled for oscillation about a first horizontal axis within a gimbal ring 13 by way of trunnions 14, the ring, in turn, being journalled for oscillation about a second horizontal axis perpendicular to the first axis of oscillation by way of trunnions 15 (one only being shown in Figure 1) within a closed casing 16 having a partition wall 17 therein.

In order to maintain the gyro spin axis in a substantially vertical position, a conventional erection mechanism is provided comprising a rotating carriage 18 loosely sleeved about the spinning trunnion 11 and driven thereby at a greatly reduced speed through a slip-drive connection 19, the carriage being provided with a regulating or escapement mechanism 20, and a rolling mass or ball 21 being driven by the carriage within a ball track 22 formed on the rotor casing. Since the erection mechanism per se constitutes no part of the present invention, except that its carriage constitutes a support for a reflector element to be hereinafter described, reference for a more detailed description of the structure and operation of such a mechanism is made to U. S. Patent No. 2,159,118, issued May 23, 1939, to Robert Alkan.

It will be apparent that upon the application of power to the gyro there is no way of knowing when the gyro has attained its required speed or when the spin axis thereof has attained a substantially vertical position, this being the required position before a system such as an automatic pilot can be connected to the craft control surfaces to assure proper control thereof. By the present invention a novel indicating mechanism is provided whereby the human pilot at a remote point from the "blind" gyro is informed as to the existence or non-existence of certain required conditions at the gyro.

To this end, carriage 18 of the erection mechanism supports thereon or has formed integrally therewith a reflector element such as a mirror 23 which is adapted for reflecting radiant energy from a suitable source such as a lamp 24, for example, mounted to the right of wall 17 within casing 16 to a conventional phototube 25, having an anode 26 and a cathode 27, also mounted to the right of wall 17 within casing 16 and spaced somewhat from lamp 24, a suitable window 28 being arranged in wall 17 between the mirror and the lamp and phototube. A lens 28a may be arranged between window 28 and reflector 23 to concentrate and cast a beam of light from the lamp on to the phototube. A shield 29 for the lamp may be provided to assure impingement on the cathode of the phototube of only those rays reflected by the mirror. So long as the gyro spin axis is in the substantially vertical position shown, for each rotation of carriage 18, mirror 23 will pass window 28 and at that moment reflect radiant energy from the lamp through lens 28a on to the cathode of the phototube to activate the latter. On the other hand, if the gyroscopic spin axis is in some position other than its substantially vertical position, mirror 23 rotating with carriage 18 will be displaced with respect to window 28 so that no energy will be reflected thereby to the cathode of the phototube.

The indicator per se is a "blinker" or "flasher" device in the form of a neon lamp 51 having two electrodes 30 and 31, the former connecting by way of a conductor 32 with the plate 33 of a conventional gas-filled tube 34 and the latter connecting by way of a conductor 35 with one end of an auto-transformer coil 36. Anode 26 of the phototube is connected by way of a conductor 37 with a substantially central point of transformer coil 36 while the cathode 38 of the tube connects by way of a conductor 39 with coil 36 in such a manner that cathode 38 is negative with respect to its related anode or plate 33. Cathode 27 of the phototube, on the other hand, connects by way of a conductor 40 with a grid 41 of the tube, and this grid as well as cathode 27 connects with the opposite end of transformer coil 36 by way of a conductor 42, resistor 43, adjustable contact 44, resistor 45 and conductor 46, resistor 45 being tapped to conductor 39. The outermost ends of coil 36 are connected by way of leads 47 and 48 to a suitable source of alternating current (not shown).

The negative charge on grid 41 of the tube 34 is initially determined by adjustment of contact 44 relative to resistor 45, the adjustment being such as to bias the grid to cut-off, i. e., with nothing more on the grid the tube will be non-conducting.

When tube 34 is non-conducting current cannot flow at lamp 51. Plate 33 of tube 34, however, will have a positive potential for each positive half cycle of A. C. current applied to coil 36 by lead 47 and cathode 38 will have a negative potential. Since grid 41 is at its most negative point the tube will be incapable of firing. For the next half or negative cycle of A. C. current at coil 36, the plate becomes negative while the cathode and grid become positive but this is immaterial because the tube conducts only when the plate is positive.

When cathode 27 of the phototube is activated or sensitized by radiant energy reflected thereto, current flows from cathode 27 to the anode thereby developing a difference in potential across resistor 43 and making grid 41 of the tube less negative so that tube 34 will fire each time that the plate is positive. As the tube fires, current is caused to flow in the plate circuit developing a difference in potential across electrodes 30 and 31 whereupon current flows between the electrodes providing a flash at lamp 51 which is extinguished as plate 33 becomes negative and cathode 27 of the photo tube is de-activated.

It will now be apparent that for each revolution of carriage 18, assuming the gyro spin axis to have attained its substantially vertical position, mirror 23 will pass window 28 and, at that point, reflect radiant energy from source 24 to activate or sensitize cathode 27 of the photo tube whereby tube 34 fires producing a flash at lamp 51. Until neon lamp 51 begins flashing or blinking, the pilot will know that his gyro is still not in the position required before the automatic steering system can be engaged with the craft control surfaces. Moreover, since the speed of the gyro rotor bears a definite relation to the speed of the erection mechanism as pointed out in the aforementioned Alkan patent, the pilot, by counting the number of flashes provided by lamp 51 in one minute, will be able to determine the speed of the gyroscope as well as its position.

Reflector element or mirror 23 has been shown as carried by the carriage of the erection mechanism, however, it could be attached as well to rotor trunnion 11 and be rotated thereby to provide the same information, when the spin axis is in its substantially vertical position, at lamp 51. In this case, however, it would be necessary to incorporate the conventional band pass filter 50 of Figure 2 within conductor 40, the filter being tuned to rotor frequency.

Assuming, for example, the rotor speed to be about 20,000 R. P. M., the frequency to be passed to grid 41 will be about 333 cycles per second. In order that the neon lamp 51 will not flash until the rotor has attained its speed, the band pass filter is made resonant to 333 cycles at which time maximum voltage will be available while other frequencies will be attenuated. The frequency of the flashes at lamp 51 with this arrangement will be high giving the effect of a continuous glow at the lamp.

Although but one embodiment of the invention has been illustrated and described, various changes and modifications in the form and relative arrangement of parts, which will now appear to those skilled in the art, may be made without departing from the scope of the invention. Reference is therefore to be had to the appended claims for a definition of the limits of the invention.

I claim:

1. The combination with a three-degree-of-freedom gyroscope having a rotor mounted for oscillation about two mutually perpendicular horizontal axes and provided with a spin axis which, when the rotor has been energized for a predetermined interval of time, is adapted for attaining a substantially vertical position but which, when the rotor is initially energized subsequent to a rest period, is at an initial position other than said substantially vertical position, together with means for erecting said spin axis into said substantially vertical position, of means for indicating at a point remote from said gyro when the gyro spin axis has been brought into said substantially vertical position by said erecting means, means comprising an electrical circuit incorporating said indicating means therein and operating the latter when the circuit is energized, and means movable with said rotor spin axis into said substantially vertical position from said initial position and rotatable about said spin axis for energizing said circuit when the spin axis has attained said substantially vertical position.

2. The combination with a three-degree-of-freedom gyroscope having a rotor mounted for oscillation about two mutually perpendicular horizontal axes and provided with a spin axis which, when the rotor has been energized for a predetermined interval of time, is adapted for attaining a substantially vertical position but which, when the rotor is initially energized subsequent to a rest period, is at an initial position other than said substantially vertical position, together with means for erecting said spin axis into said substantially vertical position, of means for indicating at a point remote from said gyro when the gyro spin axis has been brought into said substantially vertical position by said erecting means comprising a phototube for operating said indicating means when said phototube is activated, and means movable with said rotor spin axis into said substantially vertical position from said initial position and rotatable about said spin axis for activating said phototube when the spin axis has attained said substantially vertical position.

3. The combination with a three-degree-of-freedom gyroscope having a rotor mounted for oscillation about two mutually perpendicular horizontal axes and provided with a spin axis which, when the rotor has been energized for a predetermined interval of time, is adapted for attaining a substantially vertical position but which, when the rotor is initially energized subsequent to a rest period, is at a position other than said substantially vertical position, together with means for erecting said spin axis into said substantially vertical position, of means for indicating when the gyro spin axis has been erected into said substantially vertical position by said erecting means comprising an electrical circuit and a phototube in said circuit for energizing said circuit when said phototube is activated, a source of radiant energy, and means movable with said rotor spin axis into said substantially vertical position and rotatable about said spin axis for intercepting said energy from said source and reflecting it to said phototube to activate the latter when the spin axis has attained said substantially vertical position.

4. The combination with a three-degree-of-freedom gyroscope having a rotor mounted for oscillation about two mutually perpendicular horizontal axes and provided with a spin axis which, when the rotor has been energized for a predetermined interval of time, is adapted for angularly moving into a substantially vertical position but which, when the rotor is initially energized subsequent to a rest period, is at a position other than said substantially vertical position, together with a casing for said rotor and an erection mechanism on said casing for erecting said spin axis into said substantially vertical position, of means for remotely indicating when the gyro spin axis has been erected into said substantially vertical position by said erecting mechanism comprising an electrical circuit and a phototube in said circuit for energizing said circuit when said phototube is activated, a source of radiant energy, and a reflector surface carried by said rotor casing and angularly movable with said rotor spin axis into said substantially vertical position, said surface also being rotatable about said spin axis for intercepting said energy from said source and reflecting it to said phototube to activate the latter when the spin axis has attained said substantially vertical position.

5. The combination with a three-degree-of-freedom gyroscope having a rotor provided with a spin axis which, when the rotor has been energized for a predetermined interval of time, is adapted for angularly moving into a substantially vertical position but which, when the rotor is initially energized subsequent to a rest period, is at a position other than said substantially vertical position, together with a casing for said rotor and an erection mechanism on said casing for erecting said spin axis into said substantially vertical position, of means for visually indicating at a remote point when the gyro spin axis has attained said substantially vertical position comprising a neon lamp, means comprising a thermionic tube connected to said lamp for energizing the latter when said tube is energized, a source of radiant energy, means responsive to radiant energy for energizing said tube, and means angularly movable with said rotor into said substantially vertical position and rotatable about said spin axis for reflecting energy from said source to said radiant energy responsive means when the spin axis has attained said substantially vertical position.

ALAN M. MacCALLUM.

REFERENCES CITED

The following references are of record in the file of this patent:

UNITED STATES PATENTS

| Number | Name | Date |
|---|---|---|
| 1,455,795 | Logan | May 22, 1923 |
| 1,746,562 | Sounitza | Feb. 11, 1930 |
| 1,957,236 | Stewart | May 1, 1934 |
| 2,317,632 | Miller | Apr. 27, 1943 |
| 2,365,601 | Sipman | Dec. 19, 1944 |
| 2,438,406 | Konet | Mar. 23, 1948 |

FOREIGN PATENTS

| Number | Country | Date |
|---|---|---|
| 548,661 | Great Britain | Oct. 20, 1942 |